June 13, 1967     A. E. DOSKOCIL     3,325,127
ROD HOLDER
Filed June 23, 1966
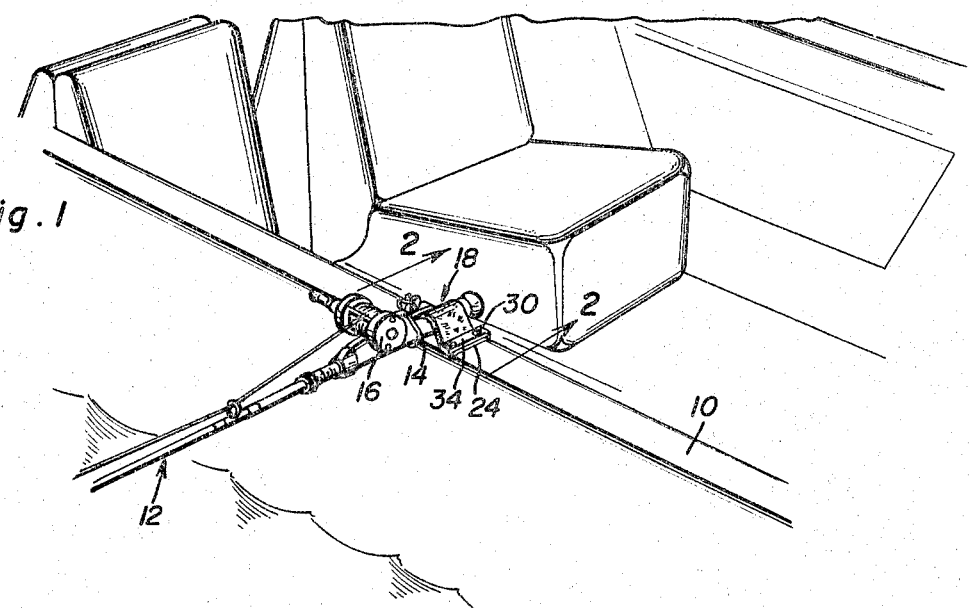
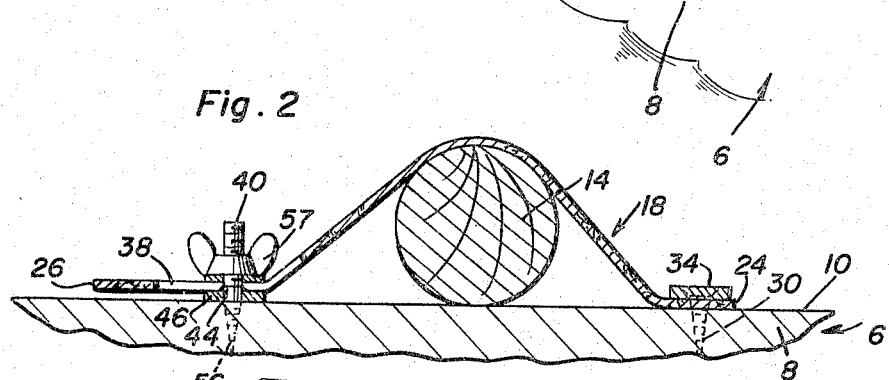
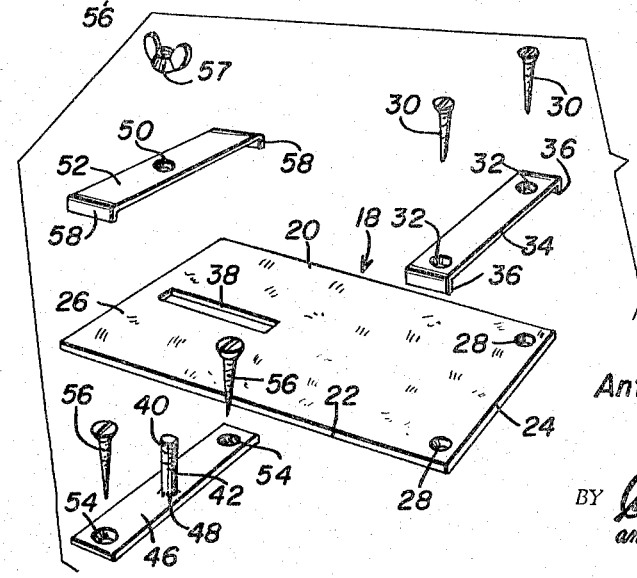
Anthony E. Doskocil
INVENTOR.
BY Clarence A. O'Brien
and Harvey B. Jackson
Attorneys

3,325,127
ROD HOLDER
Anthony E. Doskocil, Rte. 2, Box 490,
Arlington, Tex. 76010
Filed June 23, 1966, Ser. No. 559,770
5 Claims. (Cl. 248—38)

This invention relates to a new and improved rod holder which while capable of desirable and practical use in many fields of endeavor wherever portable rods, poles, flagstaffs and the like are customarily erected and clampingly held, is expressly designed and adapted to suspend and detachably hold a fishing pole or, alternatively, a conventional-type reel-equipped fishing rod in readiness for use when angling from a fishing boat, pier, wharf or the like.

The nature and scope of the herein disclosed concept can best be assessed and classified as a simple, practical and economical rod holder which lends itself to acceptable and orientated use on and in connection with a relatively stationary support surface, for example, the usual flat top or upper edge of the gunnel of a fishing boat.

In carrying out the present invention a broad flexible handgrip positioning and holding strap is employed. This strap is made of leather, strong durable fabric, plastic material, or a suitable combination of such materials. To the ends desired the strap has one end portion bracketed or secured in place by a first rigid strip member or cleat broadly designated as anchoring means. The other end portion is free and provided with a lengthwise keeper slot. This slotted end is designed and adapted to be sandwiched and adjustably and clampingly bound between two similar strip members one directly above the other. One strip member provides a stationary base and is equipped with a fixed upstanding screw-threaded stud. This stud is aligned with and passes upwardly through the strap-end slot and through a stud hole in the complemental or companion strip member and thus functions to accommodate and hold a thumb nut which, in turn, clamps the strap holddown strip member or cleat in place.

The overall combination features a strap with one end bracketed atop the gunnel, the other free slotted end adjustably bracketed or clampingly fastened also atop said gunnel and the slack portion therebetween looped and retentively tautened and bound over the rod's handle or grip so that the latter can be freed by loosening the thumb nut, then manually freely handled to play the hooked fish in the manner desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view showing a fragmentary portion of a support, more specifically a fishing boat, detailing a fragmentary portion of the gunnel or side wall, showing a conventional reel-equipped fishing rod and, what is more important, the improved rod holder and how it is constructed and mounted atop the gunnel;

FIGURE 2 is an enlarged section, taken on the plane of the section line 2—2 of FIGURE 1; and FIGURE 3 is an exploded perspective view wherein all of the component parts of the ready-to-install holder are shown in coacting relationship.

Briefly the overall concept is characterized by a flexible leather or equivalent holddown strap the median or body portion of which is adapted to bridge over and retentively hold the handgrip of a fishing rod. Anchoring means is provided for securely attaching one end of the strap to a relatively stationary support surface. Complemental means is employed for detachably and adjustably securing the other end portion of the strap to the support surface. The strap is of a length and width and degree of flexibility to bind, steady and hold the handgrip of a fishing rod or the like in a manner to permit the user to have ready access to the rod whereby it can be freed from the strap and support surface and angled in a desired manner.

The support means herein disclosed comprises a fishing boat which is denoted generally at 6 in FIG. 1 and comprises a side wall or gunnel 8 whose flat lengthwise edge or support surface is denoted at 10. It is on this surface that the improved rod holder is cooperatively mounted. The expression "rod" is utilized here to identify any suitable pole, flagstaff or the like which is intended to be temporarily held in a usable position and removed whenever necessary or described. For convenience of description the rod shown in FIG. 1 comprises a conventional type fishing rod 12 having a handle or handgrip 14 and a line-equipped reel 16. As shown in FIG. 2 in particular, it is the handle or handgrip 14 which is to be supported and clampingly held on the edge or support surface 10.

The handgrip positioning and holding strap 18 (FIG. 3) is of requisite flexibility, length and width. The strap which has been experimentally and successfully used to date is generally rectangular in form and is characterized by spaced parallel longitudinal inner and outer edges 20 and 22, one transverse end at the right as at 24 and the opposite end or edge is denoted at 26. The end or edge 24 is provided with apertures or fastener holes 28 for passage of holddown screws 30 which are, in turn, adapted to pass through holes 32 provided therefor in a first strip member 34. This strip member is of a length that it extends transversely across the end portion 24 and has lateral or downturned flanges 36 which rest atop the edge 10 when the strip is screwed in place. This strip member is also referred to as an anchoring cleat for the anchorable or attachable end portion of the leather handgrip bridging and holddown strap 18. The other end portion 26 is provided midway between the edges 20 and 22 with a suitably elongated slot 38. This slot is adapted to accommodate passage therethrough of the screw-threaded portion 40 of a relatively stationary stud 42. The stud 42 has a lower end portion reduced and fitted into a hole 44 (see FIG. 2) provided therefor in the median portion of a strip member or cleat 46. The stud is welded in place at 48 and extends upwardly through the slot 38 and also through a single stud hole 50 provided therefor in the median portion of the third strip member or cleat 52. The strip member 46 has holes adjacent its ends as at 54 to accommodatingly receive the attaching and holddown screws or equivalent fasteners 56. These fasteners are screwed into the gunnel and the cleat 46 is thus fastened transversely across the edge or surface 10 at a prerequisite distance from the first-named strip member or cleat 34. The screw-threaded portion of the stud is adapted to accommodate the readily accessible and easily applicable and removable thumb nut 57 which is applied and used in the manner shown in FIGS. 1 and 2. The strip member or cleat 52 corresponds in construction to the first-named strip member or cleat 34 and accordingly extends transversely across the slotted portion of the strap and has downturned reinforcing flanges 58 applied and used in the manner evident, it is submitted from the views of the drawing.

As is also evident from the drawing one end portion 24 of the strap 18 is securely anchored in place by the narrow rigid cleat 34 superimposed upon, extending transversely across, and is secured properly in place by fastening screws 30. The other end portion 26, which is regarded as the free end portion, is adjustably as well as detachably connectible with two cooperating narrow strip members 46 and 52 one above the other. More specifically, the slotted end portion 38 is sandwiched between the cleats 46 and 52. By properly locating and orienting the cleats and strip members (34, 46 and 52) sufficient slack is provided so that the median portion of the strap bridges over and binds the handle 14 in the manner shown in FIG. 2. Accordingly, the free slotted end portion 26 can be pulled and tightened after which the thumb nut 57 can be screwed down to hold the rod in a steady position in the manner illustrated in FIG. 1. When a fish takes the hook, the user of the rod can, of course, jerk the rod upward and thus set the hook in the mouth of the fish. After the fish is hooked, the handle of the rod can be slipped and freed from the holddown strap portion 18 and then handled in a manner to play the fish preparatory to reeling him in. The thumb nut 57 can, but does not have to be loosened. However, if the strap is too tight, or will not yield, it may then be necessary to loosen the nut just enough to allow the slotted end 26 to slide or slip slightly. Trial and error experimentation will enable the user to manipulate the rod and strap whichever way he desires or finds suitable. Usage has shown that the experienced fisherman soon learns to use the holder according to the task at hand. For instance, he will observe that when the fish jerks the rod downwardly it cannot be accidentally yanked free. In fact, the more down pressure thus imposed and exerted, the more difficult it would be for the handle to accidentally free itself. On the other hand, and according to the skill of the fisherman, the strap need not be so tight that the fisherman would encounter difficulty in jerking the rod upwardly and subsequently yanking it out of the holder to play and then reel in the fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A rod holder comprising: a flexible strap having a median body portion adapted to conformingly embrace, bridge over and retentively hold the handgrip of a fishing rod, pole or the like in a given ready-to-use position, anchoring means for securely attaching one end portion of said strap atop a relatively stationary seating and support surface for said handgrip, complemental means for detachably and adjustably securing the other end portion of said strap atop said support surface, said strap being of a length, width and degree of flexibility to bind and steady said fishing rod and permitting the user to obtain ready access to the thus temporarily held rod so that it can be freed for angling use, said one end portion being adapted to be superimposed upon and fastened to said support surface by said anchoring means, said anchoring means comprising a cleat, said other end portion of said strap having a lengthwise slot, and said means for detachably securing said other end portion comprising a screw-threaded stud which is adapted to be fixedly mounted atop said support surface, said stud extending upwardly through and beyond said slot and being provided with a readily accessible thumb nut.

2. The combination according to claim 1, and wherein a strap holddown and clamping cleat is provided, said cleat extending transversely across and atop an underlying portion of said strap and having a stud hole therein which is alignable with said slot, said stud extending up through said stud hole and said thumb nut being screwed on said stud and adapted, when in use to be screwed down and thus clamped atop said clamping cleat.

3. The combination according to claim 2, and wherein said cleats are basically alike in construction, each cleat comprising a rigid strip member of a length greater than the width of said strap, the ends of said strip members being bent laterally downwardly and providing terminal hook-like flanges, said flanges overhanging coacting corresponding lengthwise marginal edge portions of the respectively orientated end portions of said strap.

4. The combination according to claim 3, and wherein the aforementioned screw-threaded stud is vertical and fixed to the median portion of a third rigid strip member similar to said previously named strip members and constituting and providing a base, said base being interposed between the slotted end portion of said strap and the aforementioned support surface and detachably screwed and held in place atop said support surface directly beneath and in coordinating alignment with said strap holddown and clamping cleat, said stud being secured to and rising vertically from a median portion of said third strip member.

5. The combination according to claim 4, and wherein said anchoring cleat is adapted to be fixed to said support surface in a position parallel with and a prescribed longitudinal distance from said third strip member, the slotted end portion of said strap being sandwiched between said third strip member and the aforementioned strap holddown and clamping cleat, said strap being of a length greater than the predetermined distance between said anchoring cleat and third strip member, whereby there is ample slack in that portion of the strap between said strip members to allow said slack portion to arch and bind over the handgrip of said fishing rod.

References Cited

UNITED STATES PATENTS 2,737,204 3/1956 La Bonte _____ 248—68 X
3,098,273 7/1963 Cochran _____ 24—73

CHANCELLOR E. HARRIS, *Primary Examiner.*

CLAUDE A. LE ROY, JOHN PETO, *Examiners.*